United States Patent
Zhang et al.

(10) Patent No.: US 10,582,440 B2
(45) Date of Patent: Mar. 3, 2020

(54) NETWORK ACCESS CONTROL METHOD AND NETWORK DEVICE

(71) Applicant: ZTE CORPORATION, Shenzhen, Guangdong Province (CN)

(72) Inventors: Di Zhang, Shenzhen (CN); Haitao Zhao, Shenzhen (CN); Guanjun Tan, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/781,478

(22) PCT Filed: Jul. 6, 2016

(86) PCT No.: PCT/CN2016/088925
§ 371 (c)(1),
(2) Date: Jun. 5, 2018

(87) PCT Pub. No.: WO2017/096848
PCT Pub. Date: Jun. 15, 2017

(65) Prior Publication Data
US 2018/0359680 A1    Dec. 13, 2018

(30) Foreign Application Priority Data

Dec. 7, 2015    (CN) .......................... 2015 1 0894578

(51) Int. Cl.
*H04L 12/26* (2006.01)
*H04W 48/06* (2009.01)
*H04W 76/11* (2018.01)
*H04L 5/00* (2006.01)
*H04W 48/10* (2009.01)
(Continued)

(52) U.S. Cl.
CPC .......... *H04W 48/06* (2013.01); *H04L 5/0057* (2013.01); *H04W 48/10* (2013.01); *H04W 48/16* (2013.01); *H04W 76/11* (2018.02); *H04L 1/0026* (2013.01)

(58) Field of Classification Search
CPC ..... H04W 48/06; H04W 48/10; H04W 48/16; H04W 76/11; H04L 5/0057
USPC .................. 370/229–236, 236.1–236.2, 252, 370/328–330, 342–345
See application file for complete search history.

(56) References Cited

U.S. PATENT DOCUMENTS

| | | | | |
|---|---|---|---|---|
| 8,346,275 B2 * | 1/2013 | Ogura | .................... | H04W 28/16 370/229 |
| 2013/0223423 A1 * | 8/2013 | Lee | ........................ | H04W 48/16 370/338 |

(Continued)

FOREIGN PATENT DOCUMENTS

| CN | 103249112 A | 8/2013 |
|---|---|---|
| CN | 103945441 A | 7/2014 |

(Continued)

*Primary Examiner* — Thai D Hoang
(74) *Attorney, Agent, or Firm* — McDonald Hopkins LLC

(57) ABSTRACT

Disclosed is a network access management method. The network access management method includes: acquiring a network transmission state between a network device and a terminal having assessed the network device; and setting an access control parameter of the network device as a target parameter value, herein the target parameter value is used for controlling the number of terminals assessing the network device to match the network transmission state.

13 Claims, 1 Drawing Sheet

A network transmission state between a network device and a terminal having assessed the network device is acquired — S10

An access control parameter of the network device is set as a target parameter value, herein the target parameter value is used for controlling the number of terminals assessing the network device to match the network transmission state — S20

(51) Int. Cl.
*H04W 48/16* (2009.01)
*H04L 1/00* (2006.01)

(56) References Cited

U.S. PATENT DOCUMENTS

| | | | | |
|---|---|---|---|---|
| 2014/0347987 A1* | 11/2014 | Fang | ............... | H04W 24/08 |
| | | | | 370/230 |
| 2015/0312098 A1* | 10/2015 | Lv | ............... | H04L 41/0813 |
| | | | | 370/254 |
| 2015/0381756 A1* | 12/2015 | Lotfallah | ............ | H04L 67/2814 |
| | | | | 726/4 |
| 2016/0262031 A1* | 9/2016 | Huang | ............... | H04L 41/0853 |
| 2017/0086186 A1* | 3/2017 | Shuai | ............... | H04W 72/048 |

FOREIGN PATENT DOCUMENTS

| | | |
|---|---|---|
| CN | 105472692 A | 4/2016 |
| WO | WO2010091152 A1 | 8/2010 |

* cited by examiner ized number of accesses is reached. The network device will equally allocate data traffic to each access terminal according to the number of terminals which access the network device. As there are more access terminals, the data traffic allocated to each terminal will be smaller, which may result in quality reduction of each access terminal, such as decrease of a network speed and a large signal-to-noise ratio or the like. When the state of a network registered by the network device itself is not good or the signal quality is poor, or a current network state can only ensure the use requirements of current access terminals, the network device still broadcasts externally, and gives no restriction on the access of excessive terminals, which will worsen the above issues. Although the current network device can set the maximum number of accessible terminals, it cannot automatically adjust and control the number of access terminals according to the type of a network registered by the network device itself and the network quality of the current access terminals, resulting in continuous access of multiple terminals until the access limit is reached when the state of the network registered by the network device itself is poor, so that the terminals accessing the network device is poor in network quality and low in network speed, and the network speed requirements of a user corresponding to each access terminal cannot be guaranteed.
NETWORK ACCESS CONTROL METHOD AND NETWORK DEVICE

CROSS REFERENCE

The present application is a U.S. National Phase Entry of International PCT Application No. PCT/CN2016/088925 having an international filing date of Jul. 6, 2016, which claims priority to Chinese Patent Application No. 201510894578.0, filed on Dec. 7, 2015. The present application claims priority and the benefit of the above-identified applications and the above-identified applications are incorporated by reference herein in their entirety.

TECHNICAL FIELD

The present document relates to, but not limited to, the field of communications, and more particularly to a network access control method and a network device.

BACKGROUND

At present, most network devices, such as Wireless-Fidelity (Wi-Fi) devices, may be accessed by multiple terminals simultaneously until the maximum number of accesses is reached. The network device will equally allocate data traffic to each access terminal according to the number of terminals which access the network device. As there are more access terminals, the data traffic allocated to each terminal will be smaller, which may result in quality reduction of each access terminal, such as decrease of a network speed and a large signal-to-noise ratio or the like. When the state of a network registered by the network device itself is not good or the signal quality is poor, or a current network state can only ensure the use requirements of current access terminals, the network device still broadcasts externally, and gives no restriction on the access of excessive terminals, which will worsen the above issues. Although the current network device can set the maximum number of accessible terminals, it cannot automatically adjust and control the number of access terminals according to the type of a network registered by the network device itself and the network quality of the current access terminals, resulting in continuous access of multiple terminals until the access limit is reached when the state of the network registered by the network device itself is poor, so that the terminals accessing the network device is poor in network quality and low in network speed, and the network speed requirements of a user corresponding to each access terminal cannot be guaranteed.

SUMMARY

The following is a brief introduction for a subject described herein in detail. The brief introduction is not intended to restrict the scope of protection of claims.

According to embodiments of the present disclosure, a network access control method and a network device are provided, which can control, according to a network transmission state between a network device and a terminal having assessed the network device, the number of terminals accessible to the network device to match the current network transmission state, to guarantee that normal network requirements of each terminal accessing the network device can be met.

According to an embodiment of the present disclosure, a network access control method is provided, which includes:

acquiring a network transmission state between a network device and a terminal having assessed the network device; and setting an access control parameter of the network device as a target parameter value, herein the target parameter value is used for controlling the number of terminals assessing the network device to match the network transmission state.

In an exemplary embodiment, setting an access control parameter of the network device as a target parameter value includes:

setting a maximum terminal access parameter of the network device as a first target parameter value, herein the access control parameter includes the maximum terminal access parameter, and the target parameter value includes the first target parameter value; or, setting an identifier broadcast enabling parameter of the network device as a second target parameter value, herein the access control parameter includes the identifier broadcast enabling parameter, the target parameter value includes the second target parameter value, the second target parameter value is used for enabling broadcast for an access identifier of the network device or for disabling the broadcast for the access identifier of the network device, and the access identifier of the network device is used for a terminal, which will access the network device, to request for access to the network device.

Setting an access control parameter of the network device as a target parameter value includes:

judging whether the number of terminals having assessed the network device is greater than the target parameter value; and if the number is greater than the target parameter value, setting the access control parameter of the network device as the target parameter value after the number of the terminals having assessed the network device is smaller than or equal to the target parameter value.

In an exemplary embodiment, setting an access control parameter of the network device as a target parameter value includes:

setting the access control parameter of the network device as the target parameter value according to a network type of a first network, to which the network device is registered, and the network transmission state, herein the network device communicates with the terminal having accessed the network device through a second network, and the network transmission state is a network transmission state in the second network between the network device and the terminal having accessed the network device.

In an exemplary embodiment, setting the access control parameter of the network device as the target parameter value according to a network type of a first network, to which the network device is registered, and the network transmission state includes at least one of the following:

if the network type of the first network is a first network type and a network transmission quality indicated by the network transmission state is a first level, setting a maximum terminal access parameter of the network device as a third target parameter value, and setting an identifier broadcast enabling parameter of the network device as a fourth target parameter value;

if the network type of the first network is the first network type and the network transmission quality indicated by the network transmission state is a second level, setting the maximum terminal access parameter of the network device as a fifth target parameter value, and setting the identifier broadcast enabling parameter of the network device as the fourth target parameter value, herein the first level is higher than the second level, and the third target parameter value is greater than the fifth target parameter value;

if the network type of the first network is a second network type and the network transmission quality indicated by the network transmission state is a third level, setting the maximum terminal access parameter of the network device as a sixth target parameter value, and setting the identifier broadcast enabling parameter of the network device as the fourth target parameter value, herein the number of terminals allowed to access the network device, corresponding to the first network type, is greater than the number of terminals allowed to access the network device, corresponding to the second network type, the second level is higher than the third level, and the fifth target parameter value is greater than the sixth target parameter value; and if the network type of the first network is the second network type and the network transmission quality indicated by the network transmission state is a fourth level, setting the identifier broadcast enabling parameter of the network device as a seventh target parameter value, herein the third level is higher than the fourth level, and the sixth target parameter value is greater than the seventh target parameter value;

herein the fourth target parameter value is used for enabling broadcast for an access identifier of the network device, the seventh target parameter value is used for disabling the broadcast for the access identifier of the network device, and the access identifier of the network device is used for the terminal, which will access the network device, to request for access to the network device.

In an exemplary embodiment, the network device includes a WIFI device.

In an exemplary embodiment, acquiring a network transmission state between a network device and a terminal having assessed the network device includes: automatically acquiring, by the network device, the network transmission state; and/or, setting an access control parameter of the network device as a target parameter value includes: automatically setting, by the network device, the access control parameter as the target parameter value.

According to an embodiment of the present disclosure, a network device is also provided, which includes: an acquisition module and a control module. Herein, the acquisition module is configured to acquire a network transmission state between a network device and a terminal having assessed the network device; and the control module is configured to set an access control parameter of the network device as a target parameter value, herein the target parameter value is used for controlling the number of terminals assessing the network device to match the network transmission state.

In an exemplary embodiment, the control module sets the access control parameter of the network device as the target parameter value in the following manner:

setting a maximum terminal access parameter of the network device as a first target parameter value, herein the access control parameter includes the maximum terminal access parameter, and the target parameter value includes the first target parameter value; or, setting an identifier broadcast enabling parameter of the network device as a second target parameter value, herein the access control parameter includes the identifier broadcast enabling parameter, the target parameter value includes the second target parameter value, the second target parameter value is used for enabling broadcast for an access identifier of the network device or for disabling the broadcast for the access identifier of the network device; and the access identifier of the network device is used for the terminal, which will access the network device, to request for access to the network device.

In an exemplary embodiment, the control module sets the access control parameter of the network device as the target parameter value in the following manner:

judging whether the number of terminals having assessed the network device is greater than the target parameter value; and if the number is greater than the target parameter value, setting the access control parameter of the network device as the target parameter value after the number of the terminals having assessed the network device is smaller than or equal to the target parameter value.

In an exemplary embodiment, the acquisition module is further configured to acquire a network type of a network to which the network device is registered; and the control module sets the access control parameter of the network device as the target parameter value in the following manner:

setting the access control parameter of the network device as the target parameter value according to the network type of a first network, to which the network device is registered, and the network transmission state, herein the network device communicates with the terminal having accessed the network device through a second network, and the network transmission state is a network transmission state in the second network between the network device and the terminal having accessed the network device.

In an exemplary embodiment, the control module sets the access control parameter of the network device as the target parameter value according to the network type of the first network, to which the network device is registered, and the network transmission state in at least one of the following manners:

If the network type, acquired by the acquisition module, of the first network is a first network type and a network transmission quality indicated by the network transmission state is a first level, setting a maximum terminal access parameter of the network device as a third target parameter value, and setting an identifier broadcast enabling parameter of the network device as a fourth target parameter value.

If the network type, acquired by the acquisition module, of the first network is the first network type and the network transmission quality indicated by the network transmission state is a second level, setting the maximum terminal access parameter of the network device as a fifth target parameter value, and setting the identifier broadcast enabling parameter of the network device as the fourth target parameter value, herein the first level is higher than the second level, and the third target parameter value is greater than the fifth target parameter value.

If the network type, acquired by the acquisition module, of the first network is a second network type and the network transmission quality indicated by the network transmission state is a third level, setting the maximum terminal access parameter of the network device as a sixth target parameter value, and setting the identifier broadcast enabling parameter of the network device as the fourth target parameter value, herein the number of terminals allowed to access the network device, corresponding to the first network type, is greater than the number of terminals allowed to access the network device, corresponding to the second network type; the second level is higher than the third level, and the fifth target parameter value is greater than the sixth target parameter value.

If the network type, acquired by the acquisition module, of the first network is the second network type and the network transmission quality indicated by the network transmission state is a fourth level, setting the identifier broadcast enabling parameter of the network device as a seventh target parameter value, herein the third level is higher than the fourth level; the sixth target parameter value is greater than the seventh target parameter value. Herein the fourth target parameter value is used for enabling broadcast for an access identifier of the network device, the seventh target parameter value is used for disabling the broadcast for the access identifier of the network device; and the access identifier of the network device is used for the terminal, which will access the network device, to request for access to the network device.

In an exemplary embodiment, the network device includes a WIFI device.

In an exemplary embodiment, the acquisition module is configured to automatically acquire the network transmission state between the network device and the terminal having assessed the network device; and the control module is configured to automatically set the access control parameter of the network device as the target parameter value.

The network access control method and the network device provided according to the embodiments of the present disclosure can automatically control, according to a network transmission state between a network device and a terminal having assessed the network device, the number of terminals accessible to the network device to match the current network transmission state. According to the embodiments of the present disclosure, when the network state of a network type to which registered by the network device is poor or normal network requirements of access terminals cannot be guaranteed due to too many access terminals, an access control parameter of the network device can be automatically and dynamically adjusted to control the number of accessible terminals, or an identifier broadcast enabling parameter of the network device can be controlled to guarantee that the normal network requirements of each terminal accessing the network device can be met. According to an embodiment of the present disclosure, a computer-readable storage medium is also provided. A computer-executable instruction is stored in the computer-readable storage medium. When the computer-executable instruction is executed, the network access control method is implemented.

After the drawings and the detailed descriptions are read and understood, other aspects may be understood.

BRIEF DESCRIPTION OF DRAWINGS

The drawings are used to provide a further understanding to the technical solutions of the present application, and constitute a part of the specification. The drawings are used together with the embodiments of the present application to explain the technical solutions of the present application, and do not form limitations on the technical solutions of the present application.

DETAILED DESCRIPTION

Embodiments of the present application will be described below in detail with reference to the accompanying drawings. It should be noted that the embodiments in the present application and the features in the embodiments may be combined with each other arbitrarily without conflict.

Figure 1:
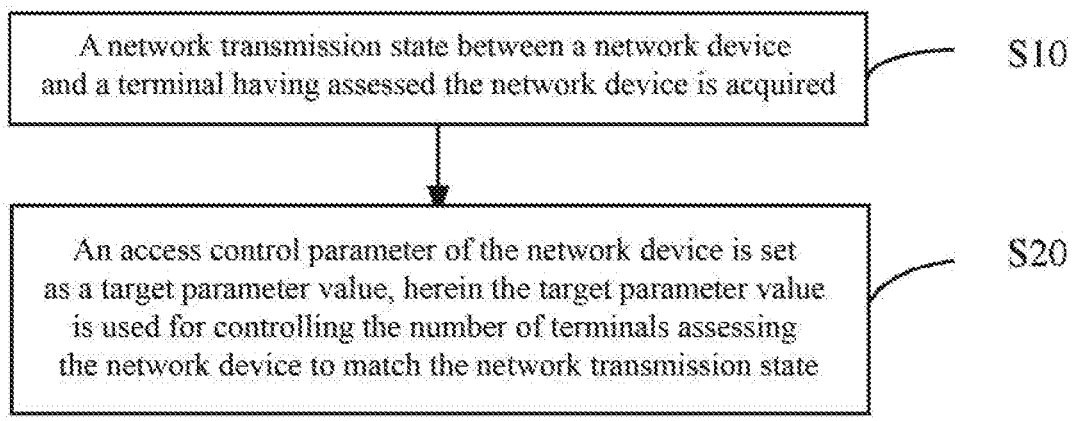
FIG. 1 is a flowchart of a network access control method according to an embodiment of the present disclosure.

FIG. 1 is a flowchart of a network access control method according to an embodiment of the present disclosure. As shown in FIG. 1, the method in the embodiment of the present disclosure includes the steps as follows.

In step S10, a network transmission state between a network device and a terminal having assessed the network device is acquired.

In an embodiment of the present disclosure, the network transmission state is characterized by network channel quality, and the network channel quality may be identified by a Channel Quality Indicator (CQI).

Herein, the operation that a network transmission state between a network device and a terminal having assessed the network device is acquired includes:

the network device acquires the number of terminals having accessed the present device, and acquires a CQI value between the network device and the terminals having accessed the present device; and the acquired CQI value is matched with a preset network channel quality level to determine the network transmission state. Herein, the preset network channel quality level is a preset CQI domain. The process includes:

the CQI value of the network device is reported to a Radio Resource Control (RRC), herein the detected CQI value includes three levels: a wideband CQI, a sub-band CQI selected by an access terminal, and an upper configured sub-band CQI. At present, according to the definitions of CQI by the RRC and a signaling parameter cqi-Report Mode Aperiodic mode in the protocol, the CQI value ranges from 1 to 15, and a larger CQI value indicates a better network state.

Table 1 shows a modulation scheme corresponding to the CQI. As shown in Table 1, CQI 15 corresponds to 64QAM (Quadrature Amplitude Modulation), and CQI 8 corresponds to 16QAM. In an embodiment of the present disclosure, the CQI is divided into four preset CQI domains, i.e., a first level, a second level, a third level, and a fourth level. Herein, the first level is: $10 \leq CQI < 15$, the second level is $7 \leq CQI < 10$, the third level is $5 \leq CQI < 7$, and the fourth level is $CQI < 5$. The acquired QCI value is matched with the preset CQI domain, and then the level of a network transmission state between the network device and a terminal having accessed the network device can be determined.

TABLE 1

| CQI index | modulation | code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In an exemplary embodiment, the operation that the network transmission state is acquired includes: the network transmission state is periodically and automatically acquired. Herein, the period may be set according to a default value of the network device or may be customized by a user.

In step S20, an access control parameter of the network device is set as a target parameter value, herein the target parameter value is used for controlling the number of terminals assessing the network device to match the network transmission state.

In an exemplary embodiment, in the present embodiment, the operation that an access control parameter of the network device is set as a target parameter value includes the following.

A maximum terminal access parameter of the network device is set as a first target parameter value, herein the access control parameter includes the maximum terminal access parameter, the target parameter value includes the first target parameter value, the maximum terminal access parameter of the network device is set as the first target parameter value matching the network transmission state thereof according to the level of the acquired network transmission state, and when the levels of the network transmission states are different, first target parameter values of an access terminal matching the network transmission state are different.

Or, an identifier broadcast enabling parameter of the network device is set as a second target parameter value. Herein, the access control parameter includes the identifier broadcast enabling parameter, and the target parameter value includes the second target parameter value. The second target parameter value is used for enabling broadcast for an access identifier of the network device, or for disabling broadcast for an access identifier of the network device. The access identifier of the network device is used for the terminal, which will access the network device, to request for access to the network device, i.e., the second target parameter value may be used for setting a state of a Service Set Identifier (SSID) broadcast of the network device, namely, enabling or disabling the SSID broadcast of the network device. When the SSID broadcast of the network device is disabled, other terminals are not allowed to access the network device, thereby guaranteeing that network resources are normally used by current access terminals.

In another embodiment of the present disclosure, the target parameter value matching the network transmission state of the network device may be set according to a default network transmission state level of the network device or customized by a network device user.

In an exemplary embodiment, in still another embodiment of the present disclosure, the operation that an access control parameter of the network device is set as a target parameter value includes:

it is judged whether the number of the terminals having assessed the network device is greater than the target parameter value; and if the number is greater than the target parameter value, the access control parameter of the network device is set as a target parameter value after the number of the terminals having assessed the network device is smaller than or equal to the target parameter value, which may be implemented in the following manners:

If the number of terminals having currently accessed the network device is greater than the target parameter value, the network device does not forcibly disconnect any access terminal, but waits until one or more terminals having accessed the network device are actively disconnected, and after the number of terminals accessing the network device is smaller than or equal to the target parameter value, the access control parameter of the network device is set as a target parameter value immediately. After the access control parameter of the network device is set as the target parameter value, no more terminals are allowed to access the network device after the number of the terminals accessing the network device reaches the target parameter value.

In an exemplary embodiment, in further another embodiment of the present disclosure, the method further includes:

the network type of a network to which the network device is registered is acquired.

In an exemplary embodiment, the operation that an access control parameter of the network device is set as a target parameter value includes:

an access control parameter of the network device is set as the target parameter value according to the network type of a first network to which the network device is registered and the network transmission state, herein the network device communicates with the terminal having accessed the network device through a second network, and the network transmission state is a network transmission state in the second network between the network device and the terminal having accessed the network device, and the network type refers to different networks obtained by the network device from network operators by registration, including, but not limited to, 4G network and 3G network and so on.

In an exemplary embodiment, in another embodiment of the present disclosure, the operation that an access control parameter of the network device is set as the target parameter value according to the network type of a first network to which the network device is registered and the network transmission state includes at least one of the following:

If the network type of the first network is a first network type and the network transmission quality indicated by the network transmission state is a first level, a maximum terminal access parameter of the network device is set as a third target parameter value, and an identifier broadcast enabling parameter of the network device is set as a fourth target parameter value.

If the network type of the first network is the first network type and the network transmission quality indicated by the network transmission state is a second level, a maximum terminal access parameter of the network device is set as a fifth target parameter value, and an identifier broadcast enabling parameter of the network device is set as the fourth target parameter value, herein the first level is higher than the second level, and the third target parameter value is greater than the fifth target parameter value.

If the network type of the first network is a second network type and the network transmission quality indicated by the network transmission state is a third level, a maximum terminal access parameter of the network device is set as a sixth target parameter value, and an identifier broadcast enabling parameter of the network device is set as the fourth target parameter value, herein the number of terminals allowed to access the network device, corresponding to the first network type, is greater than the number of terminals allowed to access the network device, corresponding to the second network type, the second level is higher than the third level, and the fifth target parameter value is greater than the sixth target parameter value.

If the network type of the first network is the second network type and the network transmission quality indicated by the network transmission state is a fourth level, an identifier broadcast enabling parameter of the network device is set as a seventh target parameter value, herein the third level is higher than the fourth level, and the sixth target parameter value is greater than the seventh target parameter value.

Herein, the fourth target parameter value is used for enabling broadcast for an access identifier of the network device, the seventh target parameter value is used for disabling broadcast for an access identifier of the network device, and the access identifier of the network device is used for the terminal, which will access the network device, to request for access to the network device.

The technical solutions of the above embodiments are described below in conjunction with the following examples.

If the network type registered by the network device is a first network type, such as a 4G network, and the network transmission state is a first level, an SSID broadcast enabling parameter is set as a fourth target parameter value, and the fourth target parameter value enables the SSDI broadcast of the network device, i.e., the broadcast is in an enabling state, and a maximum terminal access number of the network device may be set as a default maximum value of the network device, i.e., the third target parameter value described in the above embodiment.

If the network type registered by the network device is a first network type, and the network transmission state is a second level, the broadcast of the network device is still enabled, then the maximum terminal access number of the network device may be set as 80% of the default maximum value of the network device.

If the network type registered by the network device is a first network type, and the network transmission state is a third level, the broadcast of the network device is still enabled, then the number threshold of accessible terminals may be set as 50% of the maximum value.

If the network type registered by the network device is a non-4G network, i.e., a second network type, the registered network state of the network device is worse than that of the 4G network, and the maximum access numbers of terminals accessing the network device, which match different network transmission states, may be correspondingly set according to the 4G network. For example, the thresholds of the number of accessible terminals of which the network states are the first level and the second level may be respectively set as 70% and 40% of the default maximum value of the network device. When the network transmission state is a fourth level, it is set to disable the SSID broadcast of the network device and not to allow access of other terminals, i.e., the identifier broadcast enabling parameter of the network device is set as a seventh target parameter value, for disabling the broadcast for an access identifier of the network device, thereby guaranteeing normal network use requirements of current terminals.

In an exemplary embodiment, in an embodiment of the present disclosure, the network device includes, but is not limited to, a WIFI device.

In an exemplary embodiment, in another embodiment of the present disclosure, the operation that a network transmission state between a network device and a terminal having assessed the network device is acquired includes: the network device automatically acquires the network transmission state; and/or, the operation that an access control parameter of the network device is set as a target parameter value includes: the network device automatically sets the access control parameter as the target parameter value.

Embodiment Two

Figure 2:
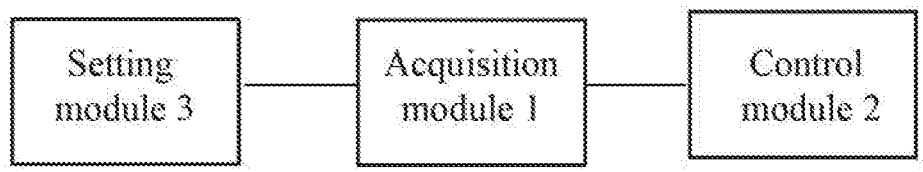
FIG. 2 is a schematic diagram of a network device according to an embodiment of the present disclosure.

FIG. 2 is a schematic diagram of a network device according to an embodiment of the present disclosure. As shown in FIG. 2, the network device in the embodiment of the present disclosure includes: an acquisition module 1 and a control module 2.

The acquisition module is configured to acquire a network transmission state between a network device and a terminal having assessed the network device.

The control module is configured to set an access control parameter of the network device as a target parameter value. Herein, the target parameter value is used for controlling the number of terminals assessing the network device to match the network transmission state.

In an exemplary embodiment, the control module sets an access control parameter of the network device as a target parameter value in the following manner:

setting a maximum terminal access parameter of the network device as a first target parameter value, herein the access control parameter includes the maximum terminal access parameter, and the target parameter value includes the first target parameter value; or, setting an identifier broadcast enabling parameter of the network device as a second target parameter value, herein the access control parameter includes the identifier broadcast enabling parameter, the target parameter value includes the second target parameter value, the second target parameter value is used for enabling broadcast for an access identifier of the network device or for disabling broadcast for an access identifier of the network device, and the access identifier of the network device is used for the terminal, which will access the network device, to request for access to the network device.

In an exemplary embodiment, in an embodiment of the present disclosure, the acquisition module sets an access control parameter of the network device as a target parameter value in the following manner: judging whether the number of the terminals having assessed the network device is greater than the target parameter value; and if the number is greater than the target parameter value, setting the access control parameter of the network device as a target parameter value after the number of the terminals having assessed the network device is smaller than or equal to the target parameter value.

In an exemplary embodiment, in another embodiment, the acquisition module is further configured to acquire the network type of a network to which the network device is registered; and the control module sets an access control parameter of the network device as a target parameter value in the following manner:

setting the access control parameter of the network device as the target parameter value according to the network type of a first network to which the network device is registered and the network transmission state, herein the network device communicates with the terminal having accessed the network device through a second network, and the network transmission state is a network transmission state in the second network between the network device and the terminal having accessed the network device.

In an exemplary embodiment, in another embodiment, the control module sets an access control parameter of the network device as the target parameter value according to the network type of a first network to which the network device is registered and the network transmission state in at least one of the following manners:

If the network type of the first network is a first network type and the network transmission quality indicated by the network transmission state is a first level, setting a maximum terminal access parameter of the network device as a third target parameter value, and setting an identifier broadcast enabling parameter of the network device as a fourth target parameter value.

If the network type of the first network is the first network type and the network transmission quality indicated by the network transmission state is a second level, setting a maximum terminal access parameter of the network device as a fifth target parameter value, and setting an identifier broadcast enabling parameter of the network device as the fourth target parameter value, herein the first level is higher than the second level, and the third target parameter value is greater than the fifth target parameter value.

If the network type of the first network is a second network type and the network transmission quality indicated by the network transmission state is a third level, setting a maximum terminal access parameter of the network device as a sixth target parameter value, and setting an identifier broadcast enabling parameter of the network device as the fourth target parameter value, herein the number of terminals allowed to access the network device, corresponding to the first network type, is greater than the number of terminals allowed to access the network device, corresponding to the second network type, the second level is higher than the third level, and the fifth target parameter value is greater than the sixth target parameter value.

If the network type of the first network is the second network type and the network transmission quality indicated by the network transmission state is a fourth level, setting an identifier broadcast enabling parameter of the network device as a seventh target parameter value, herein the third level is higher than the fourth level, and the sixth target parameter value is greater than the seventh target parameter value.

Herein, the fourth target parameter value is used for enabling broadcast for an access identifier of the network device, the seventh target parameter value is used for disabling broadcast for an access identifier of the network device, and the access identifier of the network device is used for the terminal, which access the network device, to request for access to the network device.

In an exemplary embodiment, the network device includes, but is not limited to, a WIFI device.

In an exemplary embodiment, in another embodiment, the acquisition module is configured to automatically acquire a network transmission state between a network device and a terminal having assessed the network device; and the control module is configured to automatically set an access control parameter of the network device as a target parameter value.

In an exemplary embodiment, the network device also includes: a setting module 3 configured to, according to a received user instruction, set the period of the acquired network transmission state in accordance with the default value of the network device or the customization of a user; and/or, according to a received user instruction, set the target parameter value matching the network transmission state of the network device in accordance with the default network transmission state level of the network device or the customization of a network device user.

The network access control method and the network device provided according to the embodiments of the present disclosure can automatically control, according to a network transmission state between a network device and a terminal having assessed the network device, the number of terminals accessible to the network device to match the current network transmission state. According to the embodiments of the present disclosure, when the network state of a network type to which registered by the network device is poor or normal network requirements of access terminals cannot be guaranteed due to too many access terminals, an access control parameter of the network device can be automatically and dynamically adjusted to control the number of accessible terminals, or an identifier broadcast enabling parameter of the network device can be controlled to guarantee that the normal network requirements of each terminal accessing the network device can be met, thereby improving the network experience of a user.

According to an embodiment of the present disclosure, a computer-readable storage medium is also provided. A computer-executable instruction is stored in the computer-readable storage medium. When the computer-executable instruction is executed, the network access control method is implemented.

Those of ordinary skill in the art can understand that all or part of the steps in the above method may be instructed by a program to instruct related hardware (e.g., a processor), and the program may be stored in a computer-readable storage medium, such as a read-only memory, a magnetic disk, or a compact disk or the like. In an exemplary embodiment, all or some of the steps of the above embodiments may also be implemented using one or more integrated circuits. Correspondingly, each module/unit in the above embodiments may be implemented in the form of hardware. For example, an integrated circuit is adopted to achieve corresponding functions. Or, each module/unit may be implemented in the form of software function module. For example, a processor executes a program/instruction stored in a memory to achieve corresponding functions. The present application is not limited to any specific combination of hardware and software. Those of ordinary skill in the art should understand that the technical solutions of the present application may be modified or equivalently replaced without departing from the rule and scope of the technical solutions of the present application, and the modifications and replacements should be covered in the scope of the claims of the present application.

INDUSTRIAL APPLICABILITY

The above description may guarantee high quality of a network transmission signal and high network speed of a terminal accessing a network device.

What is claimed is:

1. A network access control method, comprising:
acquiring, by a network device, a network transmission state between the network device and a terminal having assessed the network device; and
setting, by the network device, an access control parameter of the network device as a target parameter value, wherein the target parameter value is used for controlling a number of terminals assessing the network device to match the network transmission state;
wherein the setting, by the network device, the access control parameter of the network device as the target parameter value comprises:
setting the access control parameter of the network device as the target parameter value according to the network transmission state and a network type of a first network to which the network device is registered, wherein the network device communicates with the terminal having accessed the network device through a second network between the network device and the terminal having accessed the network device, and the network transmission state is a network transmission state in the second network.

2. The method according to claim 1, wherein the setting, by the network device, the access control parameter of the network device as the target parameter value further comprises:
setting a maximum terminal access parameter of the network device as a first target parameter value, wherein the access control parameter comprises the maximum terminal access parameter, and the target parameter value comprises the first target parameter value; or,
setting an identifier broadcast enabling parameter of the network device as a second target parameter value, wherein the access control parameter comprises the identifier broadcast enabling parameter, the target parameter value comprises the second target parameter value; the second target parameter value is used for enabling broadcast for an access identifier of the network device, or for disabling the broadcast for the access identifier of the network device, and the access identifier of the network device is used for a terminal, which will access the network device, to request for access to the network device.

3. The method according to claim 1, wherein the setting, by the network device, an access control parameter of the network device as a target parameter value comprises:
judging whether a number of terminals having assessed the network device is greater than the target parameter value; and
in condition that the number of the terminals is greater than the target parameter value, waiting until the number of the terminals having assessed the network device is smaller than or equal to the target parameter value, then setting the access control parameter of the network device as the target parameter value.

4. The method according to claim 1, wherein the setting the access control parameter of the network device as the target parameter value according to the network transmission state and the network type of a first network to which the network device is registered comprises at least one of the following:
when the network type of the first network is a first network type and a network transmission quality indicated by the network transmission state is a first level, setting a maximum terminal access parameter of the network device as a third target parameter value, and setting an identifier broadcast enabling parameter of the network device as a first target parameter value;
when the network type of the first network is the first network type and the network transmission quality indicated by the network transmission state is a second level, setting the maximum terminal access parameter of the network device as a fourth target parameter value, and setting the identifier broadcast enabling parameter of the network device as the first target parameter value, wherein the first level is higher than the second level, and the third target parameter value is greater than the fourth target parameter value;
when the network type of the first network is a second network type and the network transmission quality indicated by the network transmission state is a third level, setting the maximum terminal access parameter of the network device as a fifth target parameter value, and setting the identifier broadcast enabling parameter of the network device as the first type target parameter value, wherein a number of terminals allowed to access the network device, corresponding to the first network type, is greater than a number of terminals allowed to access the network device, corresponding to the second network type; the second level is higher than the third level, and the fourth target parameter value is greater than the fifth target parameter value; and
when the network type of the first network is the second network type and the network transmission quality indicated by the network transmission state is a fourth level, setting the identifier broadcast enabling parameter of the network device as a second target parameter value, wherein the third level is higher than the fourth level, and the fifth target parameter value is greater than the second target parameter value;
wherein the first type target parameter value is used for enabling broadcast for an access identifier of the network device, the second target parameter value is used for disabling the broadcast for the access identifier of the network device, and the access identifier of the network device is used for the terminal, which will access the network device, to request for access to the network device.

5. The method according to claim 1, wherein the network device comprises a Wireless-Fidelity, WIFI, device.

6. The method according to claim 1, wherein the acquiring, by the network device, the network transmission state between the network device and the terminal having assessed the network device comprises: automatically acquiring, by the network device, the network transmission state; and/or,
the setting an access control parameter of the network device as the target parameter value comprises: automatically setting, by the network device, the access control parameter as the target parameter value.

7. A network device, comprising hardware configured to execute instructions stored in a non-transitory computer readable medium to perform steps in following modules: an acquisition module and a control module, wherein
the acquisition module is configured to acquire a network transmission state between a network device and a terminal having assessed the network device; and
the control module is configured to set an access control parameter of the network device as a target parameter value, wherein the target parameter value is used for controlling a number of terminals assessing the network device to match the network transmission state;
the acquisition module is further configured to acquire a network type of a network to which the network device is registered; and the control module sets the access control parameter of the network device as the target parameter value in the following manner:
setting the access control parameter of the network device as the target parameter value according to the network transmission state and a network type of a first network to which the network device is registered, wherein the network device communicates with the terminal having accessed the network device through a second network between the network device and the terminal having accessed the network device, and the network transmission state is a network transmission state in the second network.

8. The network device according to claim 7, wherein the control module sets the access control parameter of the network device as the target parameter value in the following manner:

setting a maximum terminal access parameter of the network device as a first target parameter value, wherein the access control parameter comprises the maximum terminal access parameter, and the target parameter value comprises the first target parameter value; or, setting an identifier broadcast enabling parameter of the network device as a second target parameter value, wherein the access control parameter comprises the identifier broadcast enabling parameter, the target parameter value comprises the second target parameter value; the second target parameter value is used for enabling broadcast for an access identifier of the network device, or for disabling the broadcast for the access identifier of the network device; and the access identifier of the network device is used for the terminal, which will access the network device, to request for access to the network device.

9. The network device according to claim 7, wherein the control module sets the access control parameter of the network device as the target parameter value in the following manner:

judging whether a number of terminals having assessed the network device is greater than the target parameter value; and in condition that the number of the terminals is greater than the target parameter value, waiting until the number of the terminals having assessed the network device is smaller than or equal to the target parameter value, then setting the access control parameter of the network device as the target parameter value.

10. The network device according to claim 7, wherein the control module sets the access control parameter of the network device as the target parameter value according to the network transmission state and the network type of the first network to which the network device is registered in at least one of the following manners:

when the network type, acquired by the acquisition module, of the first network is a first network type and a network transmission quality indicated by the network transmission state is a first level, setting a maximum terminal access parameter of the network device as a third target parameter value, and setting an identifier broadcast enabling parameter of the network device as a first target parameter value;

when the network type, acquired by the acquisition module, of the first network is the first network type and the network transmission quality indicated by the network transmission state is a second level, setting the maximum terminal access parameter of the network device as a fourth target parameter value, and setting the identifier broadcast enabling parameter of the network device as the first target parameter value, wherein the first level is higher than the second level, and the third target parameter value is greater than the fourth target parameter value;

when the network type, acquired by the acquisition module, of the first network is a second network type and the network transmission quality indicated by the network transmission state is a third level, setting the maximum terminal access parameter of the network device as a fifth target parameter value, and setting the identifier broadcast enabling parameter of the network device as the first target parameter value, wherein a number of terminals allowed to access the network device, corresponding to the first network type, is greater than a number of terminals allowed to access the network device, corresponding to the second network type; the second level is higher than the third level, and the fourth target parameter value is greater than the fifth target parameter value; and when the network type, acquired by the acquisition module, of the first network is the second network type and the network transmission quality indicated by the network transmission state is a fourth level, setting the identifier broadcast enabling parameter of the network device as a second target parameter value, wherein the third level is higher than the fourth level; the fifth target parameter value is greater than the second target parameter value;

wherein the first target parameter value is used for enabling broadcast for an access identifier of the network device, the second target parameter value is used for disabling the broadcast for the access identifier of the network device; and the access identifier of the network device is used for the terminal, which will access the network device, to request for access to the network device.

11. The network device according to claim 7, wherein the network device comprises a Wireless-Fidelity, WIFI, device.

12. The network device according to claim 7, wherein the acquisition module is configured to automatically acquire the network transmission state between the network device and the terminal having assessed the network device; and the control module is configured to automatically set the access control parameter of the network device as the target parameter value.

13. A non-transitory computer-readable storage medium, storing a computer-executable instruction, which is used to execute a network access control method, wherein the method comprises:

acquiring, by a network device, a network transmission state between the network device and a terminal having assessed the network device; and setting, by the network device, an access control parameter of the network device as a target parameter value, wherein the target parameter value is used for controlling a number of terminals assessing the network device to match the network transmission state;

wherein the setting, by the network device, the access control parameter of the network device as the target parameter value comprises:

setting the access control parameter of the network device as the target parameter value according to the network transmission state and a network type of a first network to which the network device is registered, wherein the network device communicates with the terminal having accessed the network device through a second network between the network device and the terminal having accessed the network device, and the network transmission state is a network transmission state in the second network.

* * * * *